United States Patent [19]

Morawetz et al.

[11] 4,263,961
[45] Apr. 28, 1981

[54] METHOD AND AN APPARATUS FOR STORING HEAT ENERGY

[75] Inventors: Ernst Morawetz; Birgit I. Morawetz, both of Staffanstorp, Sweden

[73] Assignee: Teknoterm Systems, AB, Malmo, Sweden

[21] Appl. No.: 960,535

[22] Filed: Nov. 14, 1978

[30] Foreign Application Priority Data

Nov. 14, 1977 [SE] Sweden ................. 7712829

[51] Int. Cl.³ .......................... F28D 21/00
[52] U.S. Cl. .................. 165/1; 165/104 S; 126/436
[58] Field of Search .......... 165/104 S, 1; 126/436, 126/400; 62/430

[56] References Cited

U.S. PATENT DOCUMENTS

| 3,848,416 | 11/1974 | Bundy | 165/104 S X |
| 4,086,958 | 5/1978 | Lindner et al. | 165/104 S |

Primary Examiner—Albert W. Davis
Attorney, Agent, or Firm—Jones, Tullar & Cooper

[57] ABSTRACT

A method and an apparatus for storing heat energy in a hybride heat storage apparatus comprising a first and a second material are disclosed, the first and the second materials having different melting temperatures and different densities and being non-mixable. When heat is discharged from the heat storage apparatus, the first material, which has the lower melting temperature, is brought into direct heat exchanging contact with the second material which is essentially in a liquid state by causing droplets of the first material having a lower temperature than the melting temperature of the second material to pass through the second material, whereby the droplets of the first material are heated and may be used in order to give off the heat in an outer circuit, while the second material sets essentially in droplet form. When heat is supplied to the heat storage apparatus, liquid flow channels are formed through the second material, which is essentially in a solid state, whereupon droplets of the first material, which have a higher temperature than the melting temperature of the second material are caused to pass through the flow channels whereby the second material around the flow channels are caused to melt by direct heat exchange. Preferably, the first material has a higher density than the second material, the first material being sprayed or showered onto the material. The hybride heat storage apparatus comprises a vessel containing the first and the second material, the said materials being located in layers on top of each other; supply line which comprises a droplet forming apparatus, whereby the first material, which has the lower melting temperature, is divided into droplets; and a discharge line for the first material.

9 Claims, 4 Drawing Figures

METHOD AND AN APPARATUS FOR STORING HEAT ENERGY

The present invention relates to a method and an apparatus for storing heat energy in a hybride storage apparatus, the heat storage capacity of which is at least twice as great as the heat storage capacity of a water tank having the same outer volume.

A hybride heat storage apparatus comprises two different materials having different melting temperatures and different densities, the materials having a very limited relative solubility, i.e. they are not mixable. One of the materials having the lower melting temperature is used as a heat conveyor, while the other material is used as a heat storage material by using its melting heat. If the other material has a bad heat conducting capacity there are still problems concerning the heat transfer between the two materials, which problems will be appreciable at small temperature differences.

The heat transfer between a solid (or liquid) material of low heat conducting capacity and a liquid heat carrier is technically a very difficult problem and normally requires large temperature gradients and large heat-exchanging surfaces which are expensive. In a solar heating system these problems become additionally difficult since the heat from the sun collector will normally be available at a relatively low temperature level. The efficiency of a solar heating system is consequently dependent on whether an effective heat transfer can take place at low temperature differencies, in particular at the heat storage apparatus.

The present invention relates specifically to adapting a hybride heat storage apparatus for use together with a solar heating system.

Experiments have been made for a long time in order to solve the problems connected with the storing of heat in a salt hydrate melt, e.g. glauber salt, calcium chloride hydrate, iron chloride hydrate, etc. These materials have a relatively high melting heat and are relatively inexpensive. The process for storing melting heat is seemingly very simple. Heat absorption and and storing take place by melting chrystalline material in a solid state by supply of heat, whereby the material is obtained in a liquid state. When heat is given off the reverse process takes place.

The problems derives chiefly from
(a) the phase conversion process
(b) the heat transfer between the meltable material and a heat carrier, usually a liquid or a gas
(c) life of the system
(d) the corrosiveness of the meltable material
(e) the embodiment of the encasing and the heat exchange
(f) the melting temperature During the phase conversion process (a) unfavourable effects may occur, such as phase separation, sedimentation of chrystals, chemical disintegration and undercooling.

The heat transfer (b) and the encasing and heat transfer (e) are generally brought about in such a way that the heat storing material is enclosed in a large number of small containers each of which is in contact with the heat carrier. As a result, good heat transfer is obtained but the encasing will easily become expensive and the containers must be piled or locked in any suitable manner.

Salt hydrates have a limited life (d). However, non-complex materials such as water/ice or paraffins are free from this problem.

Furthermore, salt hydrates in particular have a high corrosiveness (d), which creates problems at the encasing.

Many materials having a high melting heat have a too high or a too low melting temperature to be technically usable (f). In order to avoid this problem it is possible to use a heat pump.

According to the present invention the above problems are solved in the following way. A non-complex material, such as paraffin, water or an oil, is used as a heat storing medium, whereby the problems connected with the phase conversion (a) the life of the system (d) the corrosiveness (d) and the melting temperature (f) are avoided. As an example a paraffin is discussed hereinafter without limiting the invention to this particular material. Paraffin has the drawback of having a heat conducting capacity which is markedly inferior to that of water for instance, especially in a molten state, for which reason the problem connected with the heat transfer must be solved.

The present invention is based on the following physical properties.

Two non-mixable materials can be brought into immediate contact with each other without being mixed, i.e. becoming dissolved in each other. Furthermore, the surface of a liquid material may be multiplied by being divided into drops or droplets, Finally, two non-misable liquids of different densities will form layers on each other without mixing.

These physical properties are used in such a way that the first material which is the heat carrier and thas the lower melting temperature, e.g. water, is divided into drops or droplets and is caused to pass through the other material. e.g. paraffin in drop form, in which connection the heat carrier will effectively assume the temperature of the other material due to the large contact surface.

An object of the present invention is to provide a method of storing heat energy in the form of melting heat in a hybride heat storage apparatus consisting of a first and a second material having different melting temperatures and different densities, which materials are not mixable in their liquid states. The method comprises the steps that when heat is extracted from the heat storage apparatus, the first material, which has the lower melting temperature, is brought into direct heat exchanging contact with the second material which is essentially in a liquid state by causing droplets of the first material having a lower temperature than the melting temperature of the second material to pass through the second material, whereby the droplets of the first material are heated and may be used in order to give off the heat in an outer circuit, while the second material sets essentially in droplet form and that when heat is supplied to the heat storage apparatus, liquid flow channels are formed through the second material, which is essentially in a solid state, whereupon droplets of the first material, which have a higher temperature than the melting temperature of the second material are caused to pass through the flow channels, whereby the second material around the flow channels is caused to melt by direct heat exchange. Preferably, the first material has a higher density than the second material, the first material being sprayed or showered onto the second material.

Another object of the invention is to provide a hybride heat storage apparatus comprising a vessel containing the first and the second material, the said materials being located in layers on top of each other; and a supply line which comprises a droplet forming apparatus, whereby the first material, which has the lower melting temperature, is divided into droplets; and a discharge line for the first material.

The invention will now be described in more detail with the aid of a preferred embodiment, reference being made to the accompanying drawings.

Figure 1:
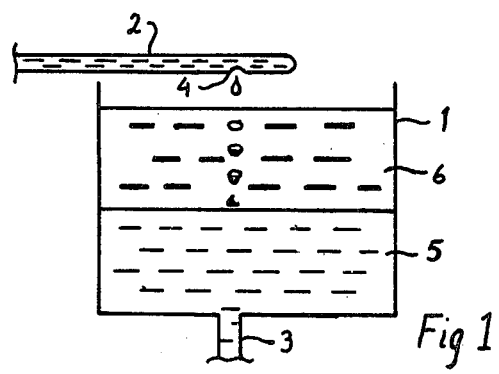
FIG. 1 and FIG. 2 are diagrammatic views showing the principle of the invention.

FIG. 1 shows the principle for discharging heat from the heat storage apparatus. The apparatus consists of a vessel 1 having an inlet 2 and an outlet 3. The vessel 1 contains a quantity of the first material 5 located at the bottom of the vessel and a quantity of the second material 6 floating on the first material. The first material consists of water and the second material consists of paraffin. The paraffin has melting temperature of approximately 52° C. and is in a molten state. The inlet pipe 2 is provided with a drop forming apparatus 4, whereby water is given off drop-wise. The paraffin 6 and the water 5 at the bottom of the vessel 1 have the same temperature, which is higher than 52° C., e.g. 54° C. Since the paraffin is lighter than water its floates on the water.

If cold water having a temperature of less than 52° C. is supplied through the inlet 2 and is allowed to drip through the drop forming apparatus 4 the following process takes place. The droplet reaches the surface of the molten paraffin and begins to sink through the paraffin layer. While sinking the droplet absorbs heat from the hot paraffin, while the paraffin in the immediate vicinity of the droplet is cooled. When the temperature of the paraffin in the immediate vicinity of the droplet falls below 52° C. a certain amount of the paraffin begins to set on the underside of the droplet. The set paraffin forms a slightly cup-shaped droplet which accompanies the water droplet downwardly through the paraffin, since paraffin in a solid state has a higher density than molten paraffin. When the combination of the heat droplet and the paraffin droplet reaches the boundary between the water and the paraffin the paraffin droplet stops at the boundary while the heated water droplet passes the boundary. Accordingly as more cold water is applied through the inlet 2 additional paraffin droplets are formed the boundary between the paraffin and the water. Finally, most of the liquid paraffin has become transformed into a solid state, which implies that the melting heat stored in the paraffin has been withdrawn approximately at the melting temperature of the paraffin, i.e. at 52° C., by direct heat exchange between the water droplets and the surrounding paraffin. When almost all paraffin has set additional water droplets cannot pass and the process comes to a stop. As a result of the fact that the set paraffin droplets are slightly cup-shaped a small quantity of water is enclosed in the set paraffin mass. This limited water quantity contributes to improving the heat conductivity in the solid paraffin. The heat storage apparatus may now be charged with new heat energy until all the paraffin has molten once again.

Figure 2:
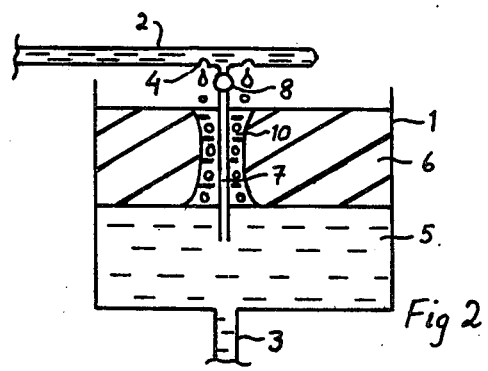

FIG. 2 shows how the heat storage apparatus is charged with heat. The heat storage apparatus according to FIG. 1 has been supplemented in this case with a vertical pipe 7 and a valve 8. The pipe 7 extends from the inlet 2 through the layer of paraffin 6 and opens into the water 5 beneath the paraffin layer. If hot water having a temperature of more than 52° C. is supplied through the inlet 2, the said water is allowed by means of the valve to pass through the pipe 7 to the water layer 5 lying below. AS aresult hereof that portion of the paraffin which lies around the pipe 7 will melt, whereby a flow channel 10 is formed through the solid paraffin layer 6. At this stage the valve 8 is closed and the hot water is allowed to drip through the drop forming device 4. The dripping water may pass through the flow channel 10, whereby a direct heat exchange between the water droplets and the molten paraffin in the flow channel takes place, and the heat is transferred from the water droplet to the paraffin and the flow channel is expanded. Finally, the entire paraffin layer 6 has molten, the heat storage apparatus being fully charged.

The water 5 in the vessel 1 may be used in an outer heat circuit in order to give off and/or absorb heat.

As mentioned above, other combinations of materials may be used, such as water/oil. If the oil has a higher density than the water the water may constitute the melting heat storing material at 0° C. It is also possible to use an oil having a lower density than water, such as a slightly vicous thermo oil. In that case the inlet 2 is provided at the bottom of the vessel 1 and the outlet 3 is provided at the upper portion of the vessel, the thermo oil lying on top of the water/ice constituting the heat carrier, whereby an inverted system is obtained.

The drop forming device 4 preferably consists of an nozzle similar to a shower nozzle having a multitude of small apertures. The water passing through the orifice is divided into fine droplets or into a drizzling flow. By the expression droplets in the present specification are meant not only separate droplets but also a flow of more or less continuous droplets or drops, or a flow consisting of a multitude of thin yets or squirts, which may possibly in part consist of drops or droplets. An essential feature of the invention is that the water supplied is divided and is disintegrated in such a way that its contact surface with the paraffin becomes great. The vertical pipe or choking heat pipe 7 performs two functions, a heat exchanging function and a choking function. The exchange takes place between the outer surface of the pipe and the adjacent paraffin so that flow channels 10 are formed during the initial stage of the charging operation. The choking function may be performed by means of a choke valve, a check valve or an on-off-valve. Alternatively, the choking heat pipe 7 may consist of a capillary tube, as is explained in more detail in connection with FIG. 4. The choking heat pipe 7 may be essentially vertical or extend downwardly in an axial spiral or may be arranged in an another manner in such a way as to have a downwardly inclination, so that the water may flow downward in the pipe.

Figure 3:
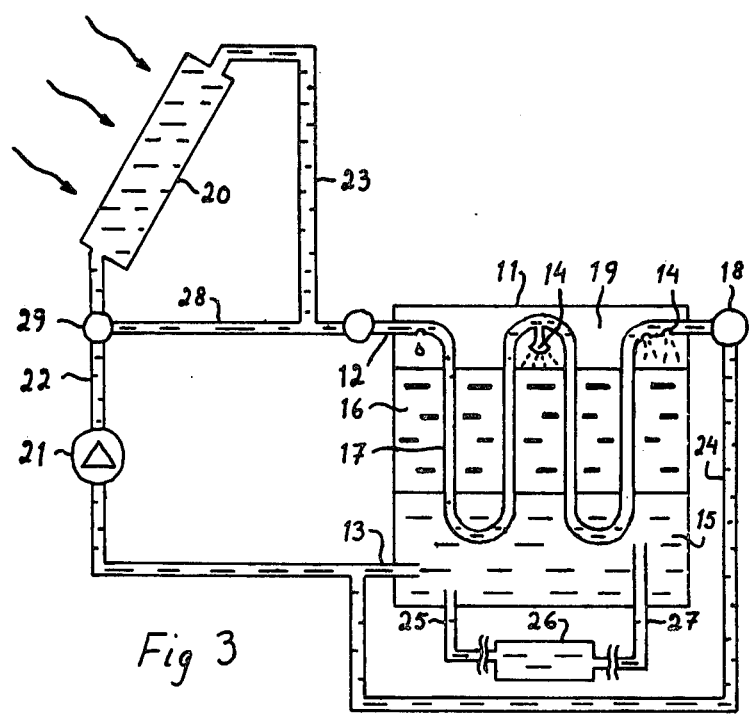
FIG. 3 is a diagrammatic view showing an application of the invention in a solar heating system.

FIG. 3 shows how the heat storage apparatus may be built into a heating system for heating of houses comprising a solar collector. The heating system comprises a vessel 11 which is filled with water 15 and paraffin 16. The space 19 is filled with a gas. The system furthermore comprises a solar collector 20, an inlet pipe 12, an outlet pipe 13, a drop forming device in the nature of perforated pipe portions 14 or a nozzle 14a and vertical pipe portions 17. A circulation pump 21 pumps the water in a circuit from the outlet pipe 13 via the riser pipe 22 to the solar collector 20 and furtheron through a down pipe 23 and a check valve to the inlet 12 of there tank 11. A shunt pipe 24 is connected from the end of the inlet pipe 12 to the outlet pipe 13 and is controlled by a valve 18. The valve may be a choke, check or on-off-valve. The shunt pipe 24 and the valve 18 may be replaced by a capillary tube. A second outlet pipe 25 leads to the heat consumer 26, from where the water is returned directly to the tank 11 via the supply pipe 27 or to the outlet pipe 13. A second shunt pipe 28 connects the riser pipe 22 with a down pipe 23 via a three-way valve 29.

The function of the system will now be explained. When heat is supplied the three-way valve 29 is in the position where the shunt pipe 28 is closed. At the beginning the valve 18 is open. Water heated by the sun is now driven by means of a pump 21 from the solar collector 20 through the down pipe 23 through the inlet pipe 12 and the pipe portions 14 and 17 and further through the valve 18, the shunt pipe 24 to the outlet pipe 13 and the pump 21. Essentially no water at all will come out through the perforated pipe portion 14 since the discharge resistance for the water through the perforated apertures is greater than the flow resistance through the shunt pipe. The paraffin 16 around the pipe portion 17 begins to melt, whereby flow channels are formed. In that connection the valve 18 is closed which implies that water begins to be forced out through the perforated apertues and begins to pass through the paraffin layer to the water layer below, whereby the heat energy of the water is given off to the solid paraffin which will melt. The water flows through the outlet 13 to the pump 21 and through the riser pipe 22 to the solar collector 20. At the same time, a partial quantity of water may be circulated in the circuit 25, 26, 27 to a heat consumer. This consumer circuit is not disclosed in detail since it does not form part of the present invention.

When heat is withdrawn or discharged while the solar collector is not producing heat energy, for instance at night, the three way valve 29 is reset in such a way that the shunt pipe 28 connects the riser pipe 22 with the down pipe 23. The valve 18 is closed. Cool water from the supply pipe 27 flows through the outlet 13 to the pump 21 and further through the shunt line 28 to the inlet 12 or the vessel 11. The water is allowed to drip through the paraffin layer and is heated to a temperature of about 52° C. and is allowed to flow through the heat consumer 26. When all stored heat has been withdrawn no water can pass through the compact paraffin layer, for which reason the pressure will rise in the space 19, which may be used as a control signal in order to stop the pump 21. Alternatively, the pump may be controlled in dependence of the temperature in the paraffin layer and may be shut off when the temperature falls below about 50° (or any other suitable temperatures).

Figure 4:
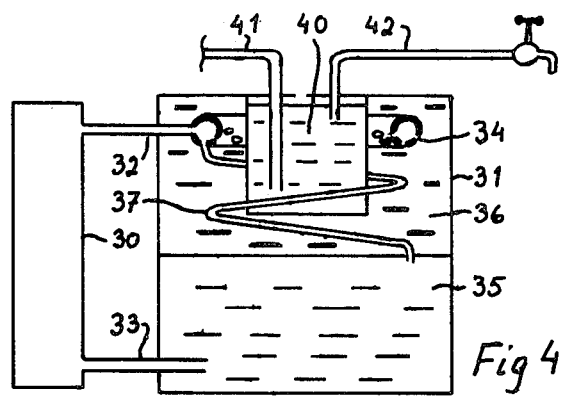
FIG. 4 is a diagrammatic view showing an application of the invention using a heat pump and in order to prepare hot tap water.

FIG. 4 shows the heat storage apparatus in connection with a heating pump 30 in order to heat hot tap water in a hot water tank. The system comprises a vessel 31 having an inlet 32, an external conventional expansion vessel (not shown) and an outlet 33 and a dropforming apparatus 34. Enclosed in the paraffin layer 36 there is a hot water tank 40 to which cold water is supplied via a supply line 41 and hot water is discharged via a discharge pipe 42. When hot water is discharged the paraffin around the hot water tank 40 will set, at the same time as the supplied cold water is heated. The drop forming apparatus 34 is located around the hot water tank 40. From the drop forming apparatus there extends a capillary tube 37 in a spiral downwardly through the paraffin layer 36 and opens into the water layer 35 lying below.

Let us assume that a paraffin layer 36 is in a completely solid state. In that case the holes or apertues in the dropforming apparatus 34 are obstructed by set paraffin. If hot water is supplied through the inlet 32 this cannot flow out through the obstructed openings but will pass through the capillary tubes 37. In that case flow channels are formed through the paraffin layer, like before. The flow through the capillary tubes is so insignificant that it can be disregarded.

The heat storage apparatus according to the invention may also be connected with separate inlets for charging and discharging. In that case the inlet pipe for supplying heat may be completely enclosed in paraffin with the perforated apertures opening into the paraffin layer. However, the inlet pipe should be located in a space above the paraffin layer, or else the perforated apertures will quickly be obstructed by set paraffin.

Capillary tubes may also be used in the embodiment according to FIG. 3 instead of the shunt pipe 24 and a valve 18 or as a heat choking pipe which passes through the paraffin layer and opens into the water layer. At the initial stage of the heat supplied to the apparatus the flow resistance through the capillary pipes is less than the discharge resistance through the perforared apertures. As soon as flow channels have been formed the discharge resistance will become reduced and the water will flow essentially along the way of less resistance through the perforated apertures and the paraffin layer while the flow through the capillary pipe may be disregarded. The dimension of the capillary pipe is adjusted in such a way that this function will be obtained.

The invention is not limited by the above embodiments but the invention should encompass all modifications which fall within the scope of the invention as set forth in the appended claims.

What is claimed is:

1. Heat exchange method for exchanging heat between first and second materials which are not mixable in their liquid states, said first material having a higher density and a lower melting temperature than the second material, said method involving a heat extracting mode and a heat storing mode, said heat extracting mode comprising the steps of causing droplets of first material at a lower temperature than the second material to pass through the second material and into a layer of first material whereby said droplets are heated while said second material solidifies, said heat storing mode comprising initially establishing flow channels through solidified second material and then directing droplets of first material at a higher temperature than the melting point of the second material from a gas-filled space positioned above the second material into said flow channels to thereby melt second material and expand said flow channels.

2. A method as recited in claim 1, in which the flow channels are initially established without directing the first material toward the second material.

3. A method as recited in claim 2, in which the first material is water and the second material is paraffin.

4. A method as recited in claim 3, in which the flow channels are initially established by passing first material at a temperature above the melting point of the second material through a loop including conduit means extending downwardly through the second material, and in which the enlargement of the channels is obtained by closing a valve in the loop whereby droplets of first material are caused to flow through apertures in the loop positioned above the initially established flow channels.

5. A method as recited in claim 1, in which the droplets of the first material in the heat extracting mode are directed into the second material from a gas-filled space above the second material.

6. A method as recited in claim 1, in which the flow channels are initially established by recirculating first material at a temperature above the melting point of the second material through a heating loop passing through the second material.

7. Apparatus for performing the method according to claim 1, comprising a vessel containing a lower layer of said first material, a layer of said second material above said layer of first material, and a gas-filled space above said layer of second material, a heat loop including conduit means having apertures in said gas-filled space which function both to direct droplets of first material through said second material during said heat extracting mode and to direct droplets into the flow channels to enlarge said flow channels during the heat storage mode.

8. Apparatus as recited in claim 7, in which said first material is water and in which said second material is paraffin.

9. Apparatus as recited in claim 8, in which said heat loop and apertures are sized so that first material does not flow through said apertures when first material is circulating in said loop and in which said heat loop includes valve means downstream of said apertures which functions on closing to cause first material flowing in said loop upstream of said apertures to flow through said apertures in the form of droplets.

* * * * *